United States Patent [19]

Hohberg et al.

[11] Patent Number: 5,159,190
[45] Date of Patent: Oct. 27, 1992

[54] RADIATING AND RECEIVING ARRANGEMENT FOR A FIBER-OPTIC SENSOR HAVING DUAL SOURCES AND DETECTORS

[75] Inventors: Gerhard Hohberg, Aalen-Dewangen; Andreas Dorsel; Wilfried Walch, both of Aalen, all of Fed. Rep. of Germany

[73] Assignee: Carl-Zeiss-Stiftung, Heidenheim, Fed. Rep. of Germany

[21] Appl. No.: 781,074

[22] Filed: Oct. 18, 1991

[30] Foreign Application Priority Data

Oct. 19, 1990 [DE] Fed. Rep. of Germany ....... 4033187

[51] Int. Cl.⁵ ............................................. H01J 40/14
[52] U.S. Cl. .......................... 250/227.24; 250/227.23; 385/16
[58] Field of Search ...................... 250/227.24, 227.23, 250/227.18; 385/16, 18, 13, 19

[56] References Cited

U.S. PATENT DOCUMENTS 3,870,396  3/1975  Racki et al. ............................ 385/19
4,678,265  7/1987  Fink et al. ....................... 250/227.24

FOREIGN PATENT DOCUMENTS 9004633  6/1990  Fed. Rep. of Germany .

Primary Examiner—David C. Nelms
Assistant Examiner—Que T. Le
Attorney, Agent, or Firm—Walter Ottesen

[57] ABSTRACT

A transmitting and receiving arrangement for fiber-optic sensors includes a first radiation source L1 having radiation which is conducted via an optical switch having a wavelength-dependent transmission or reflection filter into the fiber FA going to the sensor head. The radiation returning from the fiber is conducted via the optical switch to a first detector D1. The arrangement further includes: a second detector D2 which is permanently optically coupled into the radiation path of the first radiation source L1; and, a second radiation source L2, which is switched on alternately to the first radiation source L1 and both detectors D1, D2 are subjected to the radiation of this radiation source.

17 Claims, 6 Drawing Sheets

RADIATING AND RECEIVING ARRANGEMENT FOR A FIBER-OPTIC SENSOR HAVING DUAL SOURCES AND DETECTORS

FIELD OF THE INVENTION

The invention relates to a radiating and receiving arrangement for a fiber-optic sensor wherein the radiation emitted by a radiation source is conducted in a fiber leading to the sensor head. The radiation returning from this fiber is conducted to an optoelectric receiver which includes a filter having a wavelength-dependent transmission and reflection as well as the following: optical components for collimating or focussing, for transmitting and for beam splitting or beam joining.

BACKGROUND OF THE INVENTION

In fiber-optic sensors, it is often advantageous to conduct the radiation going to the sensor head and the radiation returning from the sensor head through one and the same fiber. This corresponds to the duplex method (bidirectional transmission) known from communications technology wherein information is transmitted through one fiber in both directions.

German Utility Model DE-U1 80 04 633 and U.S. patent application Ser. No.688,098, filed on Apr. 19, 1991, now U.S. Pat. No. 5,077,813, discloses a configuration suitable for fiber-optic sensors for coupling in the radiation of a radiation source into a fiber and for guiding the returning radiation to a receiver. In this configuration, a reference beam path is provided in an arrangement identified as an optical switch. With this reference beam path, the radiation of the radiation source can be conducted directly to the receiver.

A disadvantage of this known arrangement is that reliance must be placed on mechanically movable parts when switching over to the reference beam path and when switching back to the measuring beam path. If a second receiver is provided for the reference beam path then the disadvantage must be assumed that this second receiver and, when appropriate, the amplifier corresponding thereto does not precisely have the same characteristics as the first receiver and as a consequence of the foregoing, the measurements are imprecise.

SUMMARY OF THE INVENTION

It is therefore an object of the invention to provide a radiating and receiving arrangement for a fiber-optic sensor which permits a measurement as accurate as possible and yet permits a beam interruption without movable parts.

According to a feature of the invention, the arrangement includes a second detector which is permanently optically coupled into the beam path of the radiation source. A second radiation source is provided which can be switched in intermittently as an alternate for the first radiation source with both detectors being subjected to the radiation of the second source.

There are sensors which utilize the dependence of the decay time of fluorescence processes or phosphorescence processes of the parameters (temperature, material concentration, etcetera) to be detected. Especially with these sensors, it is possible with the arrangement according to the invention to determine and to compensate the time response of the radiation sources and/or detectors during operation. With such sensors, the radiation light pulse is often delayed with respect to the current pulse by the radiation source with this delay being also dependent upon the ambient parameters such as temperature.

In accordance with the invention, a part of the radiation is continuously directed from the first radiation source to a second detector thereby making a continuous determination of the time-dependent trace of the radiation possible. Additionally, a second radiation source is provided which is driven only from time to time alternately to the first radiation source and both detectors are exposed to the radiation of the second radiation source. The relative time response for both detectors to each other is determined by this second radiation source. Furthermore, the second radiation source also permits special function controls.

The spectral distribution of the second radiation source can be as similar as possible to that of the first radiation source but it can be selected so as to be significantly different from the first radiation source. The cost of the radiation source can be less for the second alternative. Other decision criteria are for example unity of components, service life, reliability and efficiency.

In a preferred embodiment of the invention, the second radiation source is not connected by additional components to the components already provided for the first radiation source; instead, the radiation of the second radiation source reaches components already available through the air and is directed by these components to the detectors.

In another advantageous embodiment of the invention, fiber pieces or light-conducting fibers are provided between the first radiation source and the first collimation means as well as between the first detector and the collimation means corresponding thereto. In addition, light-conducting fibers are provided between the first radiation source and the second detector as well as between the second radiation source and the two detectors.

The angle of the optical switch is less than 30° in a preferred embodiment of the invention. However, angles of 90° are possible especially when the spectral distributions of the first radiation source and of the radiation returning from the fiber lie relatively far apart. This embodiment makes possible an especially simple configuration.

In an especially advantageous embodiment of the invention, an optical switch having an acute angle, the first radiation source and the first detector are all arranged in a first plane. The second plane above and parallel to the first plane contains the second radiation source and means for deflecting the radiation in the direction of the first plane. The second detector is mounted below the first plane and is mounted so as to be disposed perpendicular to this plane.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
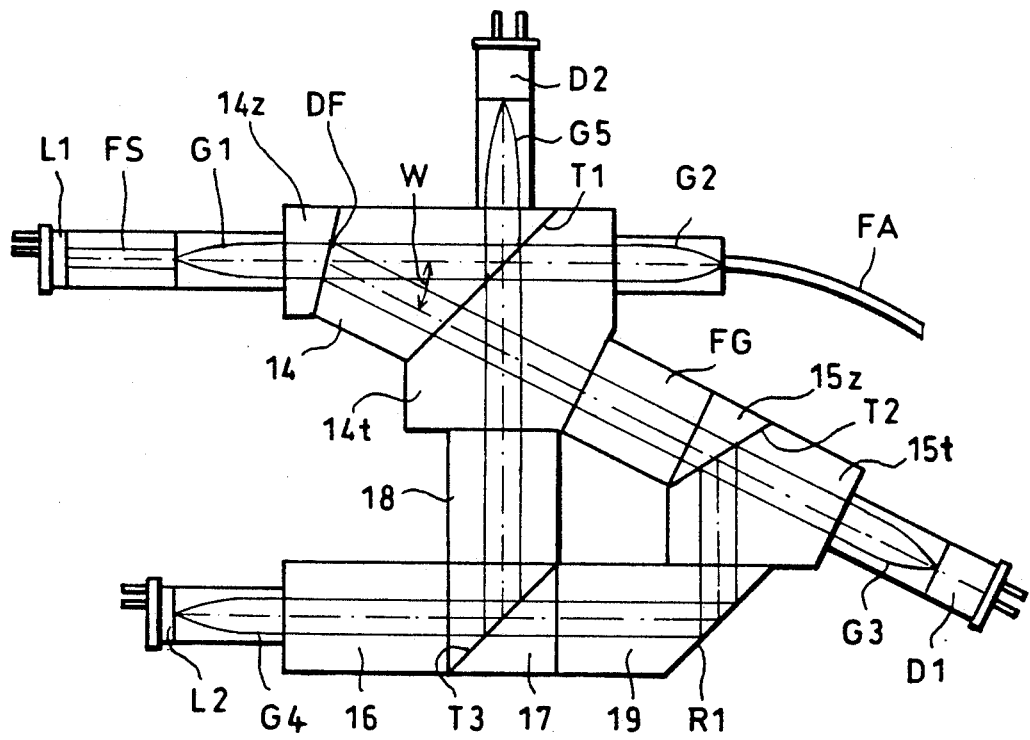
FIG. 1 is a compact embodiment of the radiating and receiving arrangement of the invention wherein all optical components are arranged in one plane.

In FIG. 1, a radiation source such as a luminescent diode is identified by reference character L1. The luminescent diode L1 is connected via a fiber piece FS or via a light-conducting fiber to the remainder of the arrangement. The fiber piece FS is disclosed in U.S. patent application Ser. No. 688,098, filed Apr. 19, 1991, now U.S. Pat. No. 5,077,813, and is incorporated herein by reference.

The end of the fiber piece FS is placed against an optical component G1 for collimating such as a GRIN-lens which collimates the radiation emanating from the end of the fiber piece. The collimated radiation passes through glass parts 14z and 14. A suitable filter DF is applied to one of these glass parts on the surface thereof bounding the other glass part. The filter DF can, for example, be made of dichroic layers which have excellent transmittance for the utilized wavelength range of the radiation source L1. The transmitted radiation is focussed by the GRIN-lens G2 on the input of the fiber FA leading to the sensor head.

The radiation returning from the fiber FA is collimated by the GRIN-lens G2 and impinges on the filter DF which has a reflection capacity as large as possible for the wavelength of the returning radiation. The component reflected at the angle W passes through the color glass filter FG which operates to prevent scattered light having the wavelength of the radiation emitted by the radiation source from reaching the detector D1. The GRIN-lens G3 focuses the beam on the detector D1.

The glass part 14 is connected to the glass part 14t via a partially transmittent divider layer T1 which has a high transmittance so that a small component of the radiation from the radiation source L1 reaches the second detector D2 via the GRIN-lens G5 and the radiation returning from the fiber FA is only slightly attenuated.

The radiation of the second light source L2 is likewise collimated by a GRIN-lens G4 and is conducted via the glass part 16, the beam splitter 17 having the divider layer T3 and the glass parts 18 and 19 to both receivers D1 and D2. The divider layer T2 between the glass parts 15z and 15t has a low reflection capacity and a high transmittance so that the radiation returning from the fiber FA is also attenuated only slightly by this divider layer T2. The filter DF, the divider layers T1, T2 and T3 and the reflection layer R1 are matched to each other for the energy relationships of a specific measuring task. The glass parts 16, 18 and 19 can be configured, as required, as color or gray glasses.

In FIGS. 2a to 2d, the individual elements are not only arranged in one plane as shown in FIG. 1; instead, the second radiation source L2 is arranged with the GRIN-lens G4, the glass parts 16 and 29 and the beam splitter 17 in a second plane above the first plane. For this reason, the glass parts 24 and 25 have another form and the divider layer T1 is contained in a cubic beam splitter 23. The second detector D2 is mounted so that its optical axis is disposed perpendicular to the first plane as shown in FIG. 2c.

Identical components in all figures are identified by the same reference characters.

Figure 3:
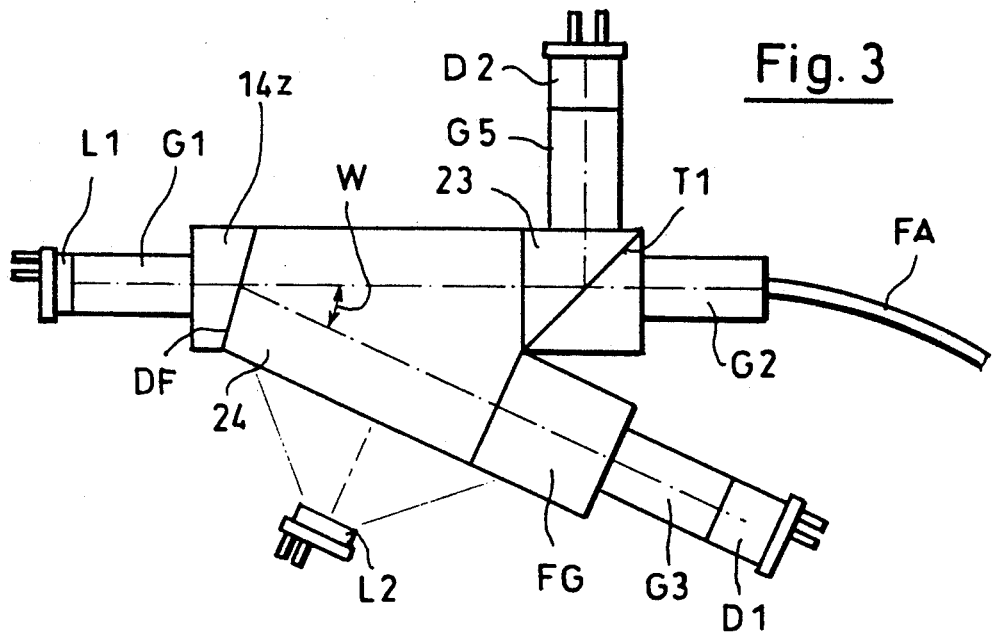
FIG. 3 shows a third embodiment of the arrangement of the invention wherein the second radiation source is not connected to the remaining parts of the arrangement via optical components.

FIG. 3 shows an embodiment of the invention wherein the radiation source L2 is not connected via optical parts to the other parts of the arrangement. Rather, the radiation from the radiation source L2 reaches, for example, parts 24 and FG through air and is conducted to the detectors D1 and D2 via these parts and the parts 23, G3 and G5 which follow. For this purpose, the parts 24 and FG have, for example, a surface having a matt (frosted) finish and a part of the radiation reaches the detectors D1 and D2 via diffuse scattering. A favorable placement of the radiation source L2 is easily determined by experimentation.

Figure 4:
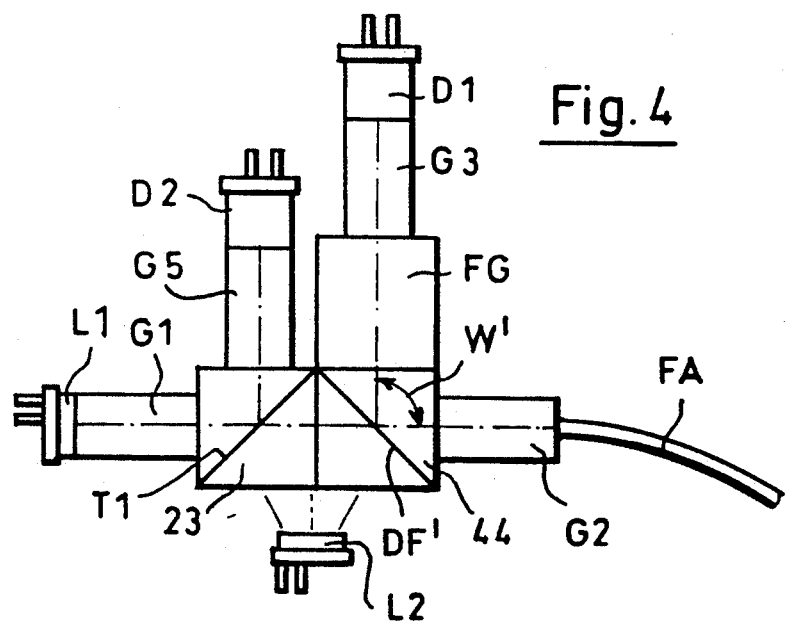
FIG. 4 is a further embodiment of the arrangement of the invention wherein the second radiation source is not connected via optical parts to the remaining parts of the arrangement.
Figure 5:
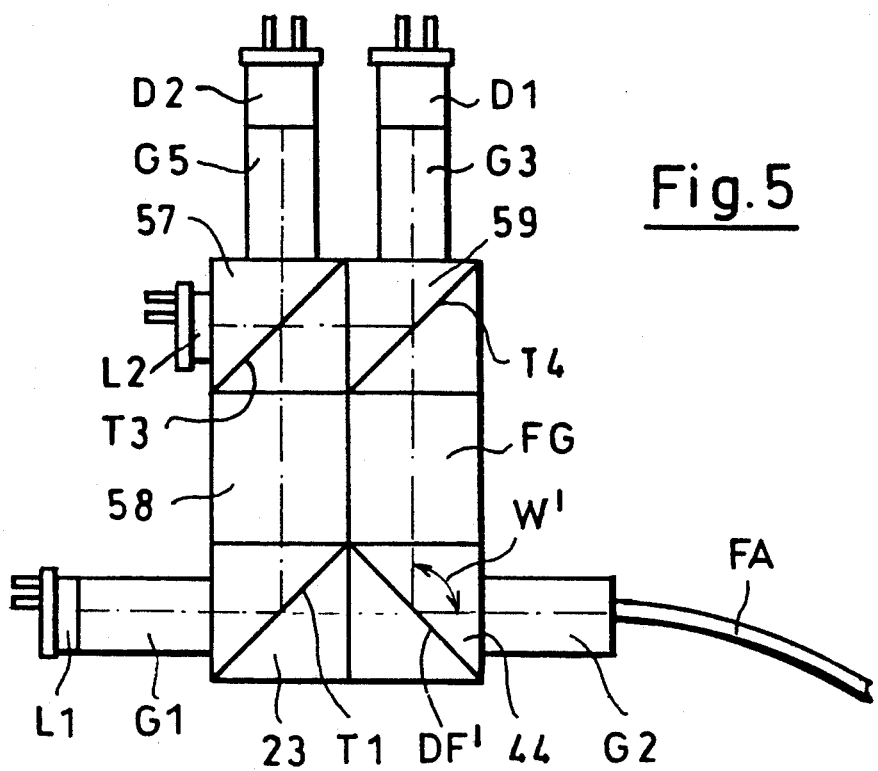
FIG. 5 is an embodiment of the arrangement of the invention showing a very compact configuration wherein the second radiation source is connected via optical parts to the remaining parts of the arrangement.

In FIGS. 3 to 5, no fiber piece is mounted after the radiation source L1 because this is necessary only when high requirements are placed on the arrangement. This is made evident in the above-mentioned U.S. patent application Ser. No. 688,098. A fiber piece of this kind can however also be utilized in the embodiments shown in FIGS. 3 to 5 and it is likewise possible to eliminate this fiber piece from the embodiment shown in FIGS. 1 and 2 when the requirements do not make it necessary.

Figure 2:
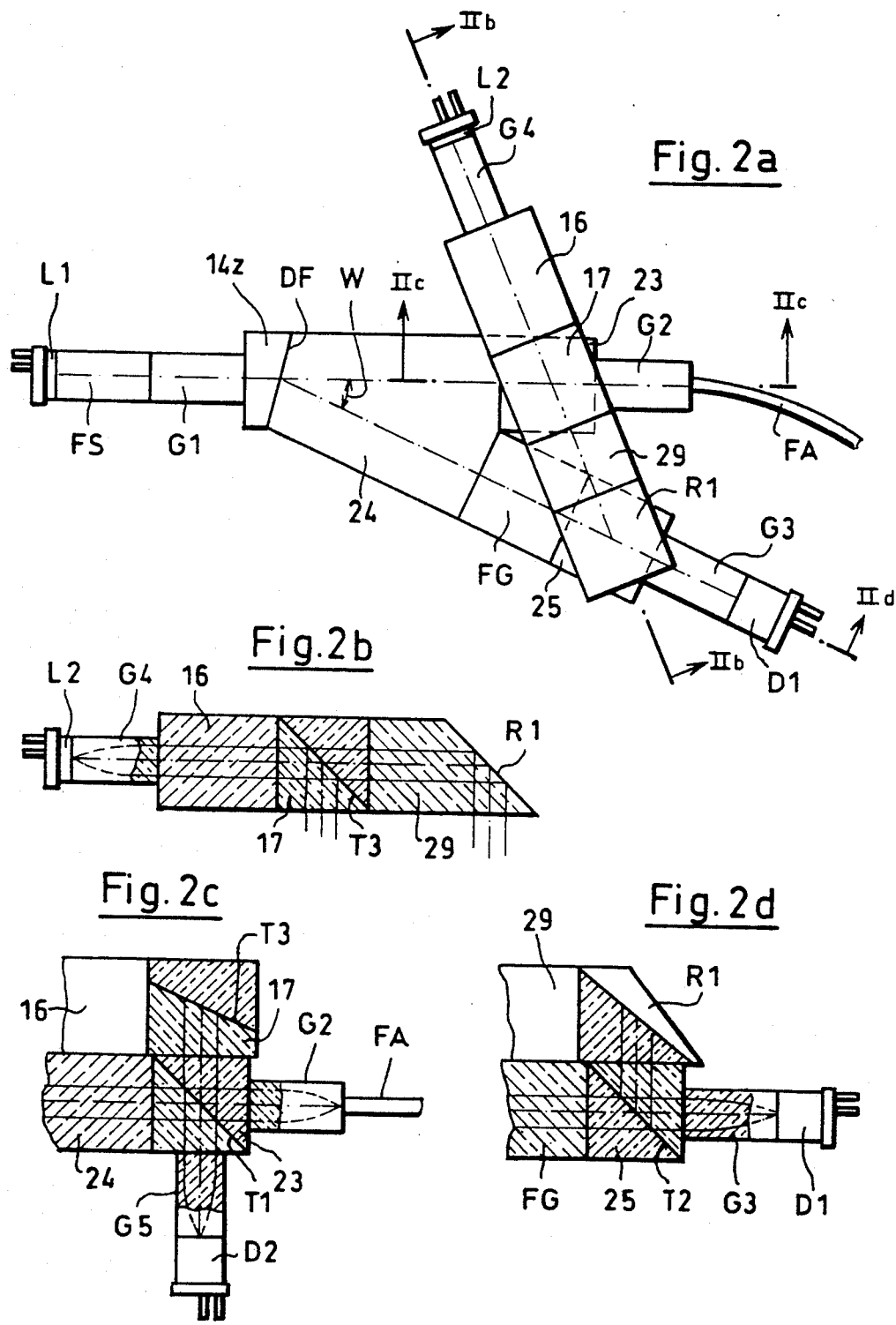
FIGS. 2a to 2d show a compact embodiment of the arrangement of the invention wherein the optical components are arranged in several planes.

In FIGS. 1 to 3, the angle W of the unit, which is also identified as an optical switch, is less than 30° and is preferably between 15° to 25°. Such an angle is also necessary for filters DF of dichrotic layers when the spectral distribution of the radiation source L1 and the radiation returning from the fiber FA lie relatively close to each other. If the radiation distributions lie relatively far apart, then an angle W' of 90° is possible. This leads to embodiments which are more easily produced of which examples are shown in FIGS. 4 to 6.

Figure 6:
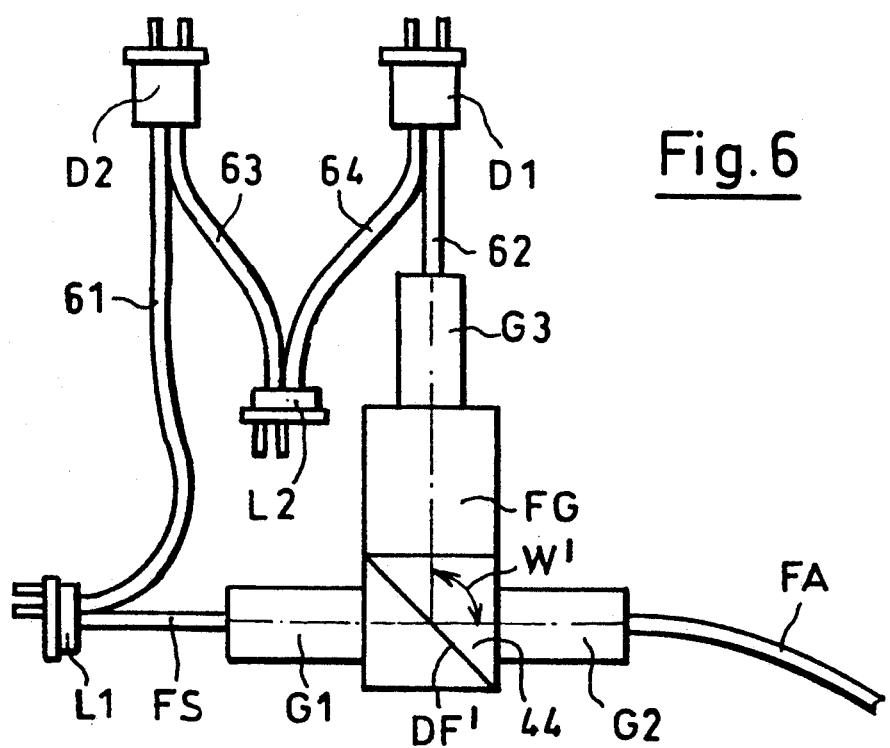
FIG. 6 is another embodiment of the arrangement of the invention wherein the second radiation source and the second detector are connected to the remaining parts of the arrangement.

In FIGS. 4 to 6, the beam splitter 23 for branching the comparison beam to the second detector D2 is mounted ahead of the filter DF' in a cubic beam splitter 44. This affords the advantage that the radiation returning from the fiber FA is not attenuated by the beam splitter for the comparison beam. However, this advantage can only be used when the spectral distribution of the radiation can be different for the two detectors. In FIG. 4, the second radiation source L2 is again not connected via optical parts to the other parts of the optical switch. As in FIG. 3, the surfaces lying opposite to the second radiation source L2 can have a matt finish.

In contrast, FIG. 5 shows an arrangement wherein the radiation of the second radiation source L2 is reflected into the beam paths going to the detectors D1 and D2 via the splitter cubes 57 and 59 having the partially transmittent layers T3 and T4, respectively. In order to obtain a compact and simple configuration, a glass part 58 is mounted in the beam path going to the detector D2 with the glass part 58 having the length of the colored glass FG.

A further advantageous possibility for the configuration of the optical switch is shown in FIG. 6. In this embodiment, the compact part comprises only the beam splitter 44 with the filter DF', the color glass FG and the three GRIN-lenses G1, G2 and G3. The connection of the radiation sources L1 and L2 as well as detectors D1 and D2 takes place via light-conducting fibers or fiber pieces. The fiber piece FS is placed on the radiation source L1 so that it receives as much radiation as possible; whereas, the light conductor 61 going to the detector D2 is mounted asymmetrically to the radiation source L1 or receives radiation from the fiber piece FS only by crossover coupling. Likewise, the light-conducting fibers 61 and the fiber piece 62 are so placed on the detectors D1 and D2 that the beams transmitted thereby are optimally received by the detectors; whereas, the beams of the light-conducting fibers 63 and 64 are only partially received.

The fiber pieces FS and 62 in FIG. 6 can be replaced with light-conducting fibers. Also, a corresponding configuration with light-conducting fibers is also possible for an acute-angle switch as shown in FIGS. 1 to 3 with the angle W.

The procedure for evaluating the signals obtained with the arrangement of the invention is shown in the following in the context of an actual application.

For this purpose, the time sequence of the essential signals is shown in FIGS. 7a to 7f. At time point t1, a current pulse is applied to the radiation source L1 or L2 with this current pulse being shown in FIG. 7a. This current pulse effects a radiation emission which is shown schematically in FIG. 7b. The radiation emission is generally delayed and therefore starts only at time t2. The radiation transmission can also be changed (mostly widened) in the time sequence. When the radiation is conducted to a luminescence sensor, secondary radiation is emitted by this sensor which can again be delayed to t3 and widened as shown schematically in FIG. 7c. In many applications, the delay t3−t2 between the primary and the secondary radiation is the measuring variable of interest.

Generally, a further time delay occurs in the detector and in the following amplifier when measuring the radiation pulses with photoelectric detectors. This time delay is dependent upon the photoelectric detectors used and is subjected to time changes. In FIG. 7d, the electrical signal of a detector is shown which results when the radiation impinges directly on the detector. FIG. 7e shows the electric signal which occurs because of the secondary radiation of the sensor. If both radiation pulses would be measured with one detector one directly behind the other, then this additional delay can be seen as a constant. In this case, the time difference t5−t4 would be the same as the desired time difference t3−t2. However, a measurement of this kind is not possible because only either the one or the other signal can impinge upon the detector for the separate evaluation.

In the above-identified patent application Ser. No. 688,098, now U.S. Pat. No. 5,077,813, this difficulty is solved in that the detector is charged sequentially with the direct radiation and the sensor radiation and the time referred to the time of current pulse t1 is measured. From this, the wanted variable is computed as $t5-t4=(t5-t1)-(t4-t1)$.

In the arrangement according to the invention, the direct radiation and the sensor radiation are measured with different detectors D1 and D2. The signal shown in FIG. 7f is used in lieu of the signal shown in FIG. 7d. In this way, an error is made because normally the electrical signals of the two detectors show different delays. However, with the second radiation source L2, which irradiates the two detectors simultaneously, an additional measurement is made and the time difference $dt=t4-t6$ determined. Then, the desired variable results as $t5-t4=(t5-t1)-(t6-t1+dt)$.

Figure 7:
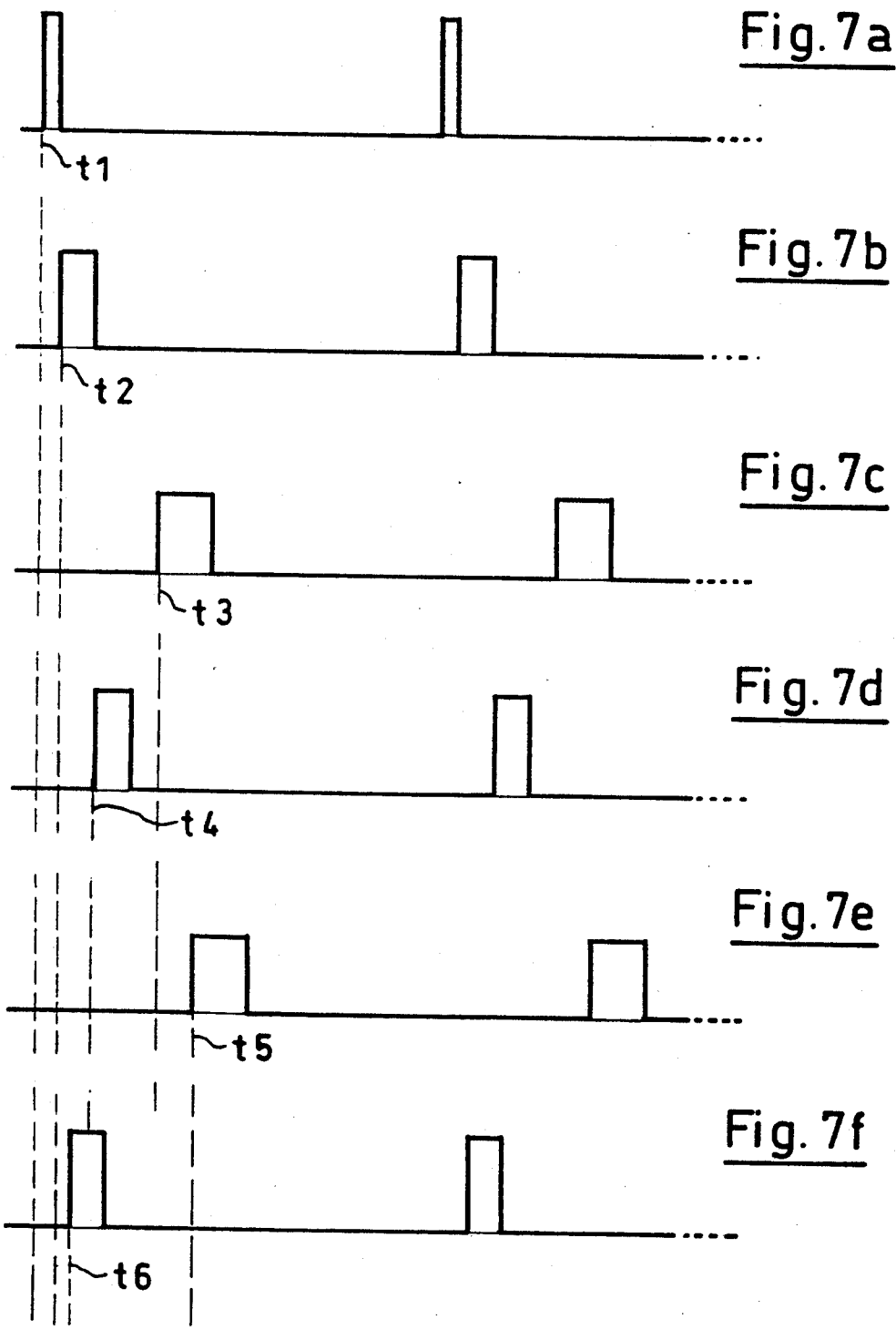
FIGS. 7a to 7f show several time diagrams for explaining the operation of the arrangement of the invention; and, FIG. 8 is a schematic block diagram of a circuit for driving the first and second radiation sources.

The control of dt takes place in specific intervals. No mechanical movement is necessary. The radiation source L2 is switched on in lieu of radiation source L1. The evaluation of the signals for determining the time differences takes place according to known methods. The time trace of the radiation emission can also have other forms especially a periodic trace as shown in FIG. 7.

Figure 8:
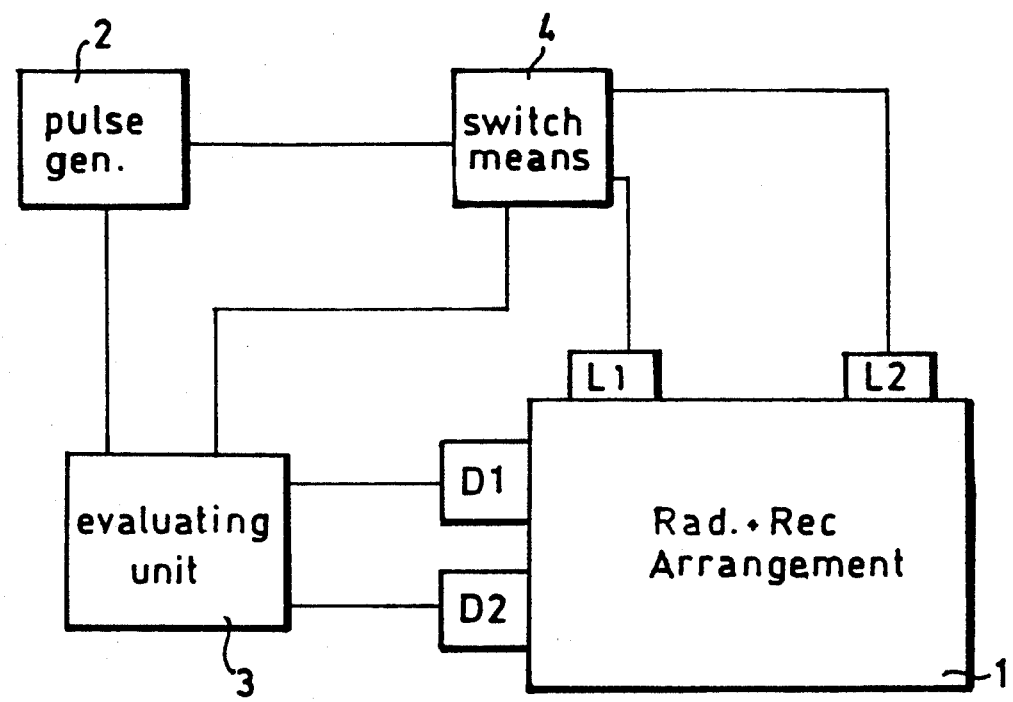

FIG. 8 shows a circuit block diagram for the embodiments of the arrangement of the invention shown in FIGS. 1 to 6. As shown in FIG. 8, the radiating and receiving arrangement 1 having radiation sources (L1, L2) and detectors (D1, D2) is connected to the following: a pulse generator 2, an evaluating unit 3 and switching means 4. The evaluating unit 3 determines the time difference (t5-t6) shown in FIG. 7 of the radiation pulse which is received by the detectors D1 and D2. The switching means 4 switches over to the second radiation source L2 after specific time intervals and simultaneously influencing the evaluating unit 3 for measuring a running time calibration $dt=t4-t6$ shown in FIG. 7.

It is understood that the foregoing description is that of the preferred embodiments of the invention and that various changes and modifications may be made thereto without departing from the spirit and scope of the invention as defined in the appended claims.

What is claimed is:

1. A radiating and receiving arrangement for conducting source radiation emitted by a first radiation source into a fiber leading to a sensor and for conducting sensor radiation returning from the sensor to an optoelectric receiver, the source radiation having a first wavelength and the sensor radiation having a second wavelength different from said first wavelength, the arrangement comprising:

a first component for collimating said source radiation;

a first beam splitter disposed downstream of said first component for passing a first part of collimated source radiation in the form of a transmitted beam along a first beam path and for splitting off a second part of said source radiation along a second beam path;

a second component disposed downstream of said beam splitter for focussing said transmitted beam onto the fiber leading to the sensor and for collimating sensor radiation returning from the sensor into a measurement beam;

filter means interposed between said first component and said second component for passing the source radiation having said first wavelength and for reflecting said measurement beam having said second wavelength at an angle with respect to said source radiation;

a first detector mounted downstream of said filter means;

a third component interposed between said filter means and said first detector for transmitting and focussing said measurement beam on said first detector;

a second detector permanently coupled into said second beam path for receiving said second part of said source radiation;

a second radiation source for emitting second source radiation;

a second beam splitter disposed downstream of said second radiation source for passing a first part of the second source radiation to said third component and said first detector and for splitting off a second part of said second source radiation and passing said second part of said second source radiation to said second detector; and, circuit means for alternately switching said first and second radiation sources on and off.

2. The radiating and receiving arrangement of claim 1, further comprising: first fiber means interposed between said first radiation source and said first component; and, second fiber means interposed between said third component and said first detector.

3. The radiating and receiving arrangement of claim 2, said first fiber means being a fiber piece and said second fiber means being a fiber piece.

4. The radiating and receiving arrangement of claim 2, said first fiber means being a light-conductive fiber and said second fiber means being a light-conductive fiber.

5. The radiating and receiving arrangement of claim 1, said angle being less than 30°.

6. A radiating and receiving arrangement for conducting source radiation emitted by a first radiation source into a fiber leading to a sensor and for conducting sensor radiation returning from the sensor to an optoelectric receiver, the source radiation having a first wavelength and the sensor radiation having a second wavelength different from said first wavelength, the arrangement comprising:

a first component for collimating said source radiation;

a beam splitter disposed downstream of said first component for passing a first part of collimated source radiation in the form of a transmitted beam along a first beam path and for splitting off a second part of said source radiation along a second beam path;

a second component disposed downstream of said beam splitter for focussing said transmitted beam onto the fiber leading to the sensor and for collimating sensor radiation returning from the sensor into a measurement beam;

filter means interposed between said first component and said second component for passing the source radiation having said first wavelength and for reflecting said measurement beam having said second wavelength at an angle with respect to said source radiation;

a first detector mounted downstream of said filter means;

a third component interposed between said filter means and said first detector for transmitting and focussing said measurement beam on said first detector;

a second detector permanently coupled into said second beam path for receiving said second part of said source radiation;

a second radiation source for emitting second source radiation and being disposed in spaced relationship to said third component so as to be separated therefrom by air;

said third component having a surface facing toward said second radiation source and said surface being matt to permit at least a portion of said second source radiation to reach said first and second detectors via diffuse scattering within the arrangement; and, circuit means for alternately switching said first and second radiation sources on and off.

7. The radiating and receiving arrangement of claim 6, said angle being less than 30°.

8. A radiating and receiving arrangement for conducting first source radiation emitted by a first radiation source into a fiber leading to a sensor and for conducting sensor radiation returning from the sensor to an optoelectric receiver, the source radiation having a first wavelength and the sensor radiation having a second wavelength different from said first wavelength, the arrangement comprising:

a first component for collimating said first source radiation;

a beam splitter disposed downstream of said first component for passing a first part of collimated source radiation in the form of a transmitted beam along a first beam path and for splitting off a second part of said source radiation along a second beam path;

a second component disposed downstream of said beam splitter for focussing said transmitted beam onto the fiber leading to the sensor and for collimating sensor radiation returning from the sensor into a measurement beam;

filter means interposed between said first component and said second component for passing the source radiation having said first wavelength and for reflecting said measurement beam having said second wavelength at an angle with respect to said source radiation;

a first detector mounted downstream of said filter means;

a third component interposed between said filter means and said first detector for transmitting and focussing said measurement beam on said first detector;

a second radiation source for emitting second source radiation;

a first fiber for optically coupling said first detector into said second source radiation;

a second detector;

a second fiber for optically coupling said second detector into said second source radiation;

a third fiber for optically coupling said second detector into said first source radiation; and, circuit means for alternately switching said first and second radiation sources on and off.

9. The radiating and receiving arrangement of claim 8, further comprising: first fiber means interposed between said first radiation source and said first component; and, second fiber means interposed between said third component and said first detector.

10. The radiating and receiving arrangement of claim 9, said first fiber means being a fiber piece and said second fiber means being a fiber piece.

11. The radiating and receiving arrangement of claim 9, said first fiber means being a light-conductive fiber and said second fiber means being a light-conductive fiber.

12. A radiating and receiving arrangement for conducting source radiation emitted by a first radiation source into a fiber leading to a sensor and for conducting sensor radiation returning from the sensor to an optoelectric receiver, the source radiation having a first wavelength and the sensor radiation having a second wavelength different from said first wavelength, the arrangement comprising:

a first component for collimating said source radiation;

a beam splitter disposed downstream of said first component for passing a first part of collimated source radiation in the form of a transmitted beam along a first beam path and for splitting off a second part of said source radiation along a second beam path;

a second component disposed downstream of said beam splitter for focussing said transmitted beam onto the fiber leading to the sensor and for collimating sensor radiation returning from the sensor into a measurement beam;

filter means interposed between said beam splitter and said second component for passing the source radiation having said first wavelength and for reflecting said measurement beam having said second wavelength at an angle with respect to said source radiation;

a first detector mounted downstream of said filter means;

a third component interposed between said filter means and said first detector for transmitting and focussing said measurement beam on said first detector;

a second detector permanently coupled into said second beam path for receiving said second part of said source radiation;

a second radiation source for emitting second source radiation and being disposed in spaced relationship to said beam splitter so as to be separated therefrom by air;

said beam splitter having a surface facing toward said second radiation source and said surface being matt to permit at least a portion of said second source radiation to reach said first and second detectors via diffuse scattering within the arrangement; and, circuit means for alternately switching said first and second radiation sources on and off.

13. The radiating and receiving arrangement of claim 12, said angle being equal to 90°.

14. A radiating and receiving arrangement for conducting first source radiation emitted by a first radiation source into a fiber leading to a sensor and for conducting sensor radiation returning from the sensor to an optoelectric receiver, the first source radiation having a first wavelength and the sensor radiation having a second wavelength different from said first wavelength, the arrangement comprising:

a first component for collimating said source radiation;

a first beam splitter disposed downstream of said first component for passing a first part of collimated source radiation in the form of a transmitted beam along a first beam path and for splitting off a second part of said source radiation along a second beam path;

a second component disposed downstream of said beam splitter for focussing said transmitted beam onto the fiber leading to the sensor and for collimating sensor radiation returning from the sensor into a measurement beam;

filter means interposed between said first beam splitter and said second component for passing the source radiation having said first wavelength and for reflecting said measurement beam having said second wavelength at an angle with respect to said source radiation;

a first detector mounted downstream of said filter means;

a third component interposed between said filter means and said first detector for transmitting and focussing said measurement beam on said first detector;

a second detector permanently coupled into said second beam path for receiving said second part of said first source radiation;

a second beam splitter interposed between said third component and said filter means for passing said measurement beam to said third component;

a second radiation source for emitting second source radiation;

a third beam splitter disposed downstream of said second radiation source and between said second detector and said first beam splitter for passing a first part of the second source radiation to said second beam splitter whereat said second part is reflected into said first detector and for splitting off a second part of said second source radiation and passing said second part of said second source radiation to said second detector; and, circuit means for alternately switching said first and second radiation sources on and off.

15. The radiating and receiving arrangement of claim 14, said third beam splitter being disposed between said second detector and said first beam splitter in said second beam path and being transmittent for passing said second part of said first source radiation to said second detector.

16. The radiating and receiving arrangement of claim 15, said angle being equal to 90°.

17. A radiating and receiving arrangement for conducting first source radiation emitted by a first radiation source into a fiber leading to a sensor and for conducting sensor radiation returning from the sensor to an optoelectric receiver, the first source radiation having a first wavelength and the sensor radiation having a second wavelength different from said first wavelength, the arrangement comprising:

a first component for collimating said source radiation;

a first beam splitter disposed downstream of said first component for passing a first part of collimated source radiation in the form of a transmitted beam along a first beam path and for splitting off a second part of said source radiation along a second beam path;

a second component disposed downstream of said beam splitter for focussing said transmitted beam onto the fiber leading to the sensor and for collimating sensor radiation returning from the sensor into a measurement beam;

filter means interposed between said first component and said beam splitter for passing the source radiation having said first wavelength and for reflecting said measurement beam having said second wavelength at an acute angle with respect to said source radiation;

a first detector mounted downstream of said filter means;

- a third component interposed between said filter means and said first detector for transmitting and focussing said measurement beam on said first detector;
- said first component, said first beam splitter, said second component, said filter means, said first detector and said third component all conjointly defining a first plane;
- a second detector mounted transversely to said first plane and being permanently coupled into said second beam path for receiving said second part of said first source radiation;
- a second radiation source mounted in a second plane parallel to said first plane for emitting second source radiation;
- a second beam splitter mounted in said second plane and being disposed downstream of said second radiation source for passing a first part of the second source radiation and for splitting off a second part of said second source radiation so as to pass through said first beam splitter and to said second detector;
- first deflecting means disposed in said second plane for deflecting said first part of said second source radiation to said first plane;
- second deflecting means disposed in said first plane for deflecting said first part of said second source radiation into said first detector; and,
- circuit means for alternately switching said first and second radiation sources on and off.

* * * * *